Figure 1:
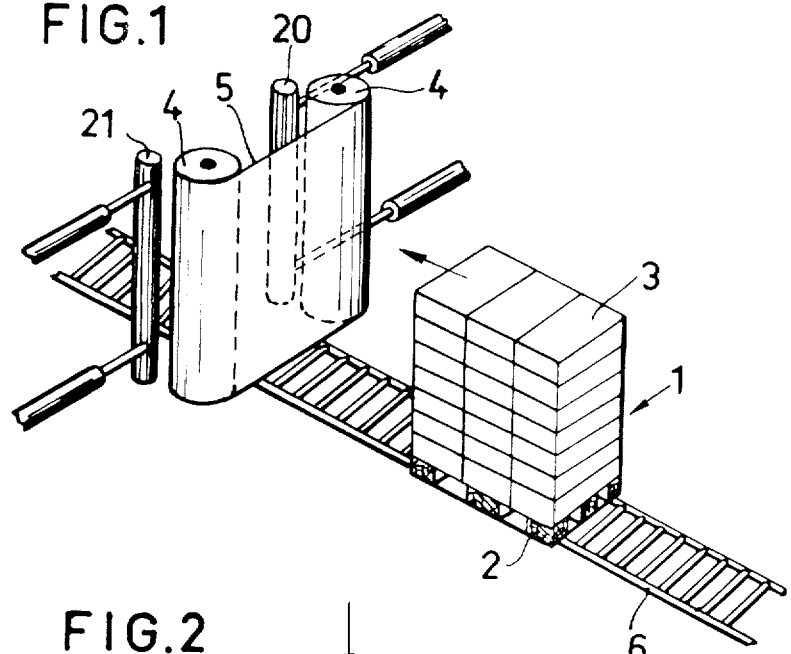

United States Patent

Ingmarson

[15] 3,672,116

[45] June 27, 1972

[54] METHOD AND MACHINE FOR PACKAGING GOODS

[72] Inventor: Martin Ingmarson, Vallingby, Sweden

[73] Assignee: Kooperativa forbundet ekonomisk forening, Stadsgarden, Stockholm, Sweden

[22] Filed: May 11, 1970

[21] Appl. No.: 36,370

[52] U.S. Cl. .................................53/3, 53/198 R, 53/229
[51] Int. Cl. ................B65b 11/10, B65b 11/48, B65b 51/30
[58] Field of Search...................53/3, 28, 33, 180, 182, 198, 53/229

[56] References Cited

UNITED STATES PATENTS

| | | | |
|---|---|---|---|
| 3,236,024 | 2/1966 | Bradley et al. | 53/198 |
| 3,508,378 | 4/1970 | Fehr et al. | 53/180 |
| 3,518,806 | 7/1970 | Davidson et al. | 53/198 X |
| 3,287,199 | 11/1966 | Virta | 53/182 X |

Primary Examiner—Theron E. Condon
Assistant Examiner—Neil Abrams
Attorney—Sommers & Young

[57] ABSTRACT

A method and apparatus for wrapping a film having an elasticity sufficient to stretch without bursting about four sides of an object, in which the object is moved into a loop of the film between two supply rollers and the film is fed from the supply rollers at a rate such that the film is stretched adjacent the fourth side of the object are then brought together and clamped along a first line while the film is still under tension. The tension on the portions of film brought together is then released. Thereafter, the portions of the film adjacent the fourth side of the object are again clamped along a line parallel to the first line of clamping. The portions of film are then welded along a line parallel to and between the two lines of clamping, and the film is then cut within the weld.

13 Claims, 12 Drawing Figures

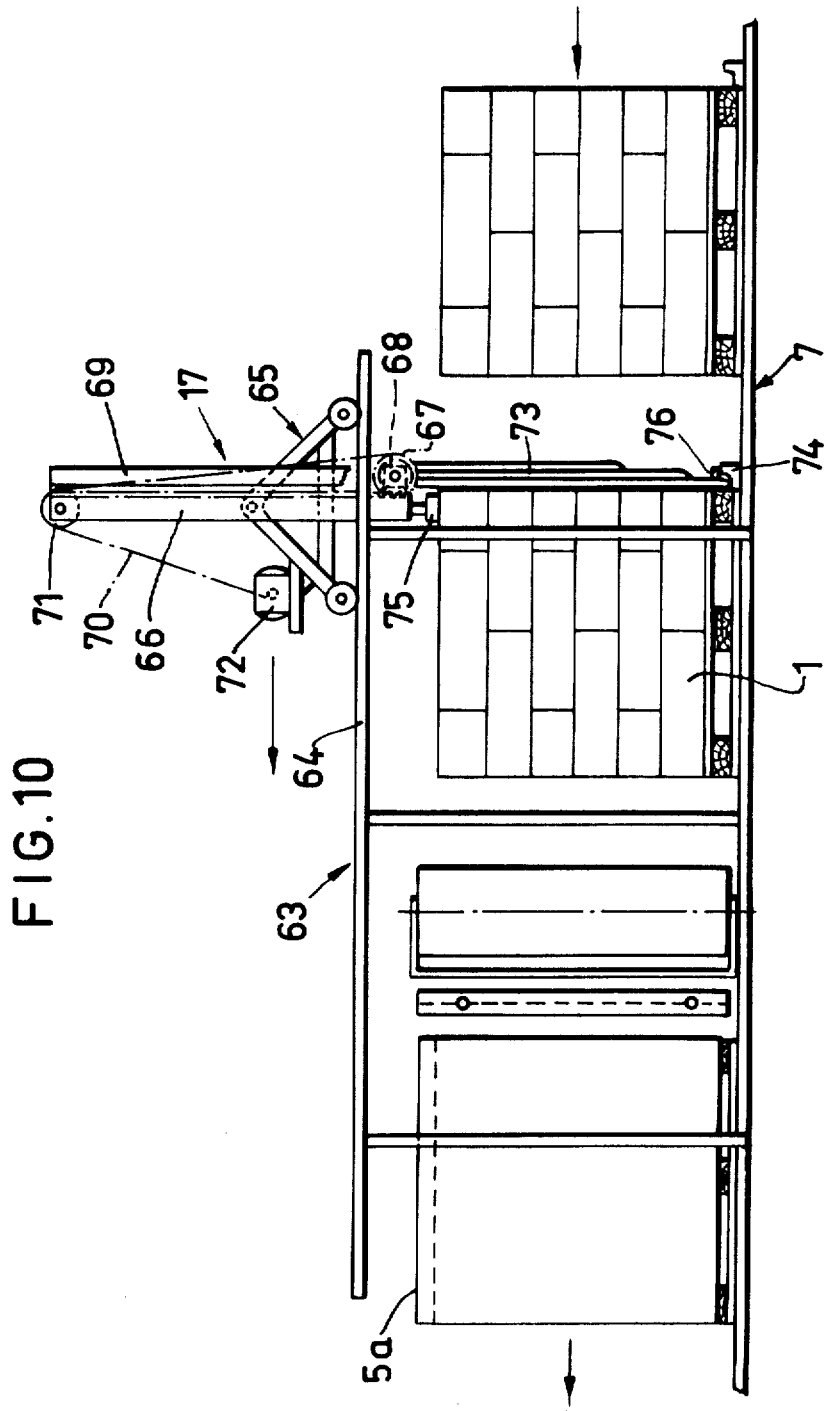

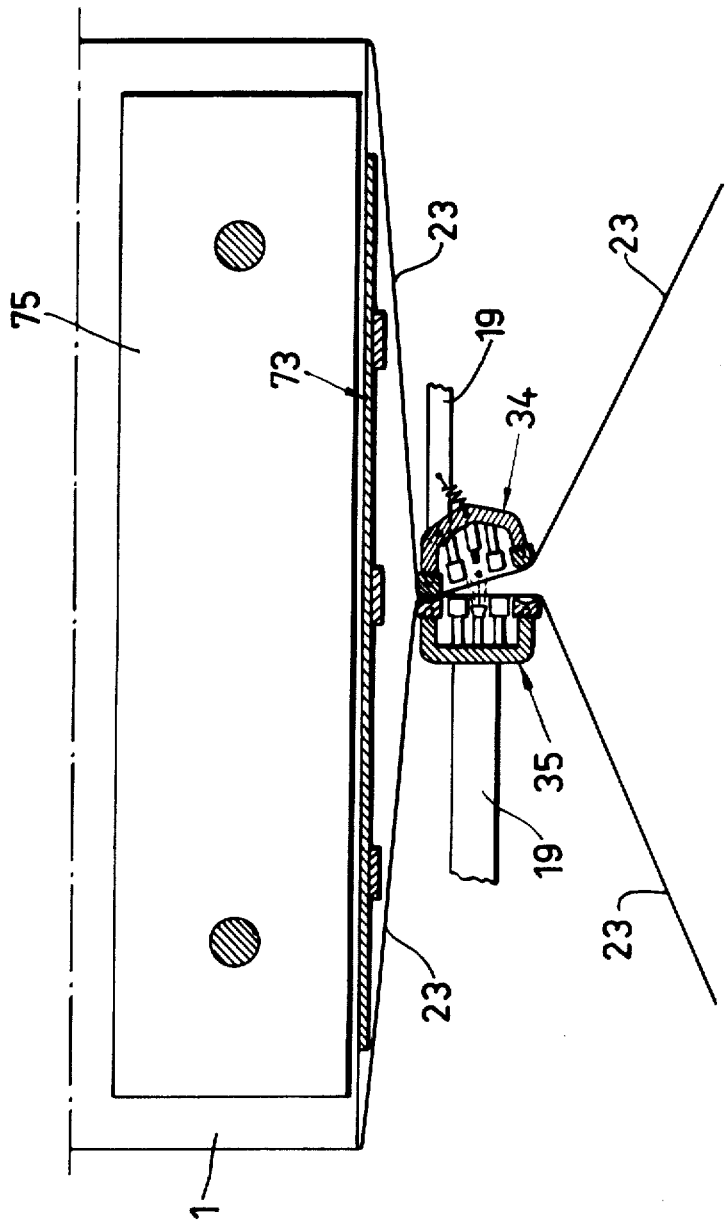

METHOD AND MACHINE FOR PACKAGING GOODS

This invention relates to a method of packaging one or several pieces of goods with or without support, in such a way, that the goods is caused to be enclosed by a coherent foil or film, which is uncoiled from two supply rolls and consists of a material, preferably plastic, having such elastic properties, that the film can be stretched to a substantial degree without loosing its elasticity, and that the film subsequent to the enclosing operation adjacent the goods is joined to itself along its entire width and cut off. The invention also relates to an arrangement for carrying out the method, comprising supply rolls, which are mounted on each side of a feed or conveying track for the goods and connected with each other by a coherent film, further means coacting with every supply roll for maintaining the film at the desired state of stress during the movement of the transport body to the predetermined position and for advancing the required amount of film, and means provided between the starting position and the predetermined position for joining the film to itself adjacent the goods.

Since a long time ago one has tried in different ways to reduce the expenses for transporting the goods from the factories to the different retail outlets. One step in these efforts has been the introduction of the so-called loading pallets, on which the goods are stacked in the factory and thereafter on said pallets distributed to retail dealers by different transport means. It was found, however, that goods stacked more or less loosely on loading pallets, particularly goods of a lighter weight, have a certain tendency of disarranging, for example at sudden brakings and changes of direction. Owing to such a disarrangement, the reloading and unloading operations are rendered much more difficult, delayed and thereby made more expensive.

For eliminating this, the transport bodies were strapped. This measure, however, has proved to be relatively expensive and time-consuming and, besides, not to provide any protection against weather and wind. During transport and storing, therefore, transport bodies containing goods sensitive to moisture has to be protected in one way or another against moisture and rain. Not before recently, in order to overcome all of the aforesaid disadvantages, a method was applied which includes the steps of drawing a bag-like cover of plastic or similar shrinkable material from above over the goods stacked on a loading pallet, and thereafter introducing the package thus obtained into a heating furnace for causing the cover to shrink and tightly to enclose the stacked goods, so that the goods is retained safely on the pallet. This method, in spite of being relatively expensive, involves such advantages that its use is recommended whereever it can be used. Due to the fact, however, that heat is applied for shrinking the bag-like covers, the application field is restricted to such goods which will not be damaged by this extra heating to about 200° C. This known method, thus, cannot be utilized in the food manufacturing industry or in industries producing such goods which are sensitive to heat and which must not or cannot be subjected to heat to an extent required for rationalizing storage and transports and, thereby, for reducing the transport, unloading and reloading expenses.

The present invention has as its object to eliminate these disadvantages and to render possible a method of packaging foods placed on loading pallets or other support members, which goods may be of any kind and, thus, also be foodstuffs and other products sensitive to heat, without using heat. The invention further has as its object to produce an arrangement for carrying out the method which preferably operates continuously without direct manual service and which can be installed at any place desired.

This is achieved by the method according to the invention which is characterized in that the film whilst being substantially stretched is caused to enclose the goods, in such a manner, that the goods is pushed in to the film, which is uncoiled with braked speed, or that the film in order to provide space for the goods so is stretched out that it abuts three of the four sides defining the goods, and the two film strands so are joined at the fourth of said defining sides of the goods, that the film strands thus joined mutually are locked to each other along a straight line, so that the stress of the film counted from said line and to the supply rolls can be released without reducing the stress of the film about the goods, that thereafter the film strands are moved against each other and along an additional straight line at some distance from said first straight line and closer to the supply rolls and locked along said line, thereby observing that the film at least between said lines is free of stress, so that two parallel welds can be made between said two locking lines whereafter the film is cut off between said welds.

The arrangement for carrying out the method is characterized in that two opposed clamping jaws are provided so as supported each on its arm to be pivoted inwardly against each other, having between themselves at its joining place the film formed by two layers, said clamping jaws having a width corresponding to that of the film and being provided each with two parallel spaced clamping strips, and therebetween being provided two pairs of welding strips and cutting means, said clamping jaws being arranged so that at the locking of the film first those two clamping jaws located closest to the goods are pressed against each other and that, subsequent to the release of the stress in the film by the coacting means of the supply rolls, the other two clamping strips are pressed against each other whereby the welding jaws can effect two parallel welds in a film area free of stress.

Figure 3:
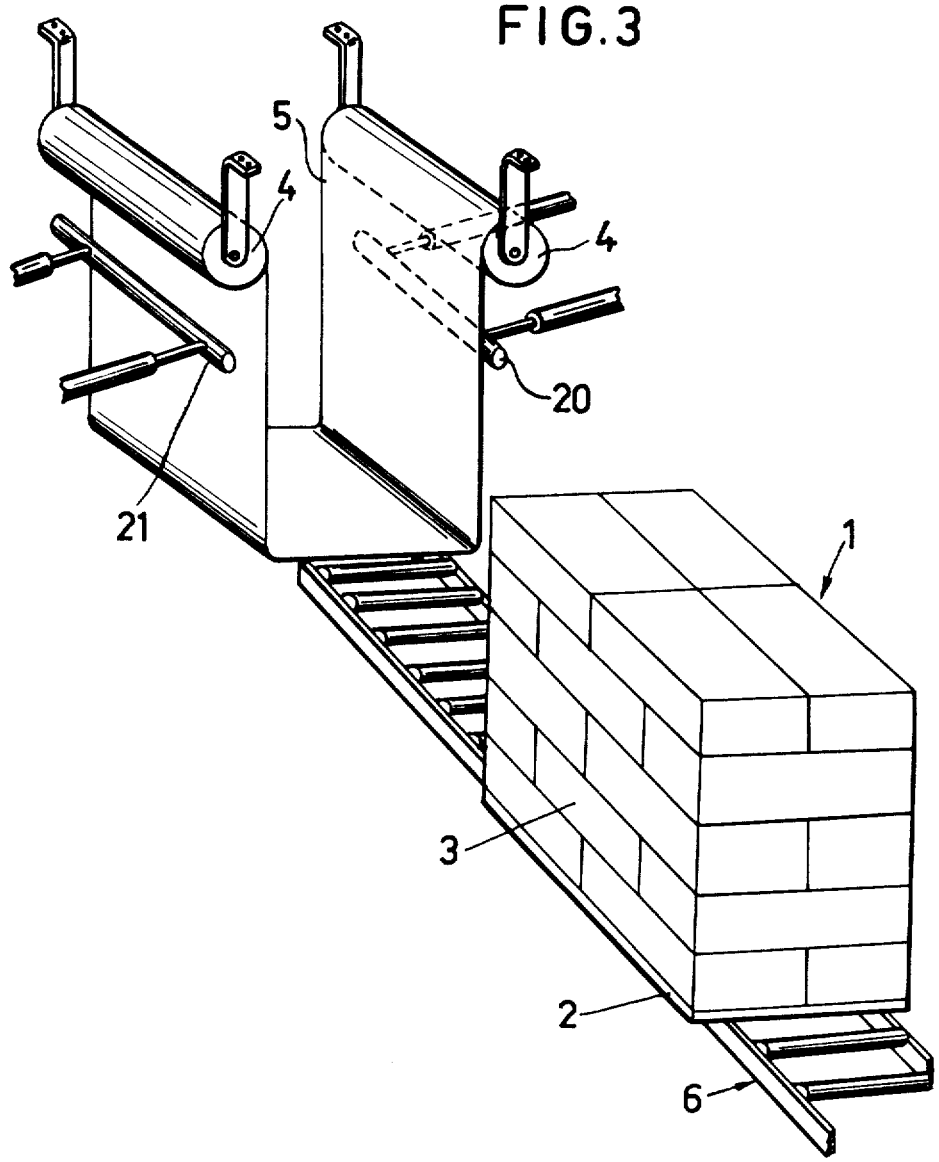
Figure 4:
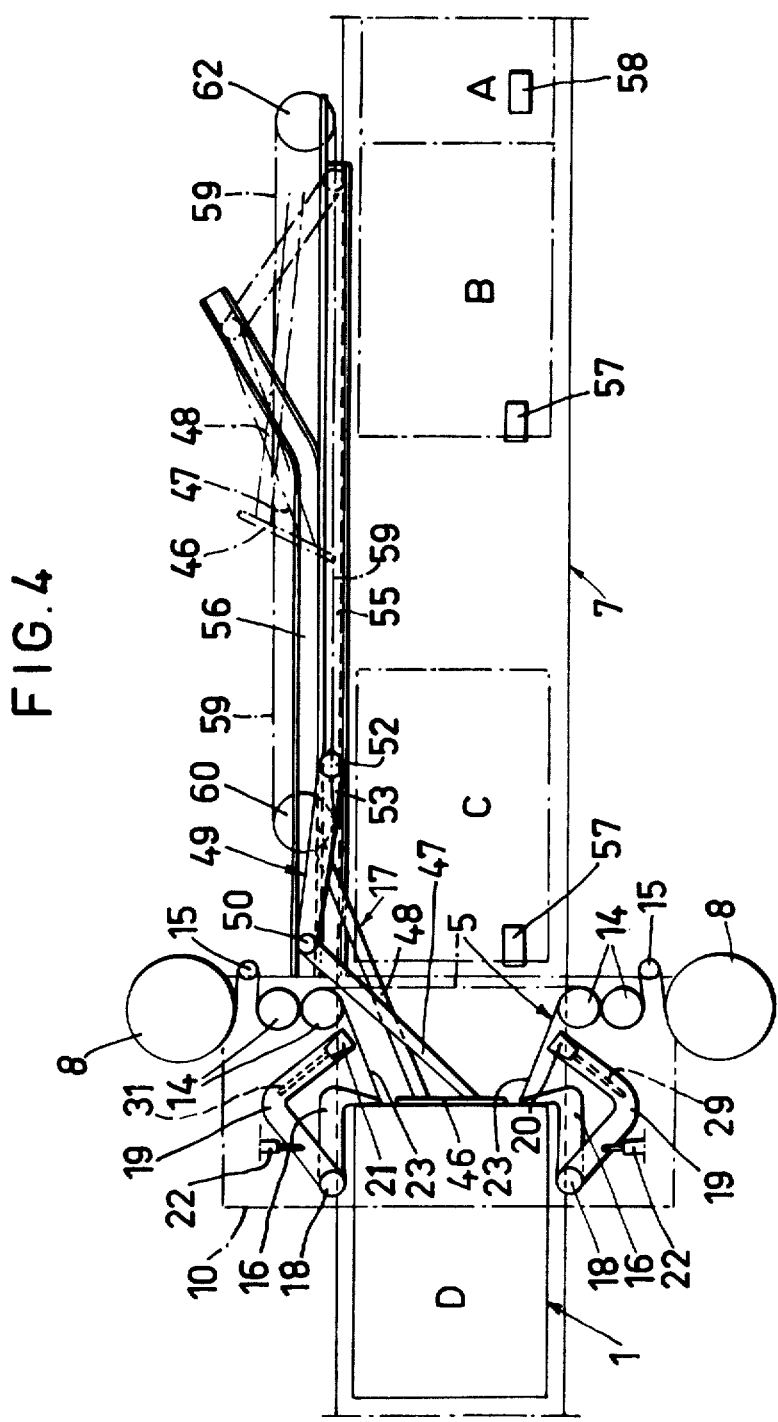
Figure 5:
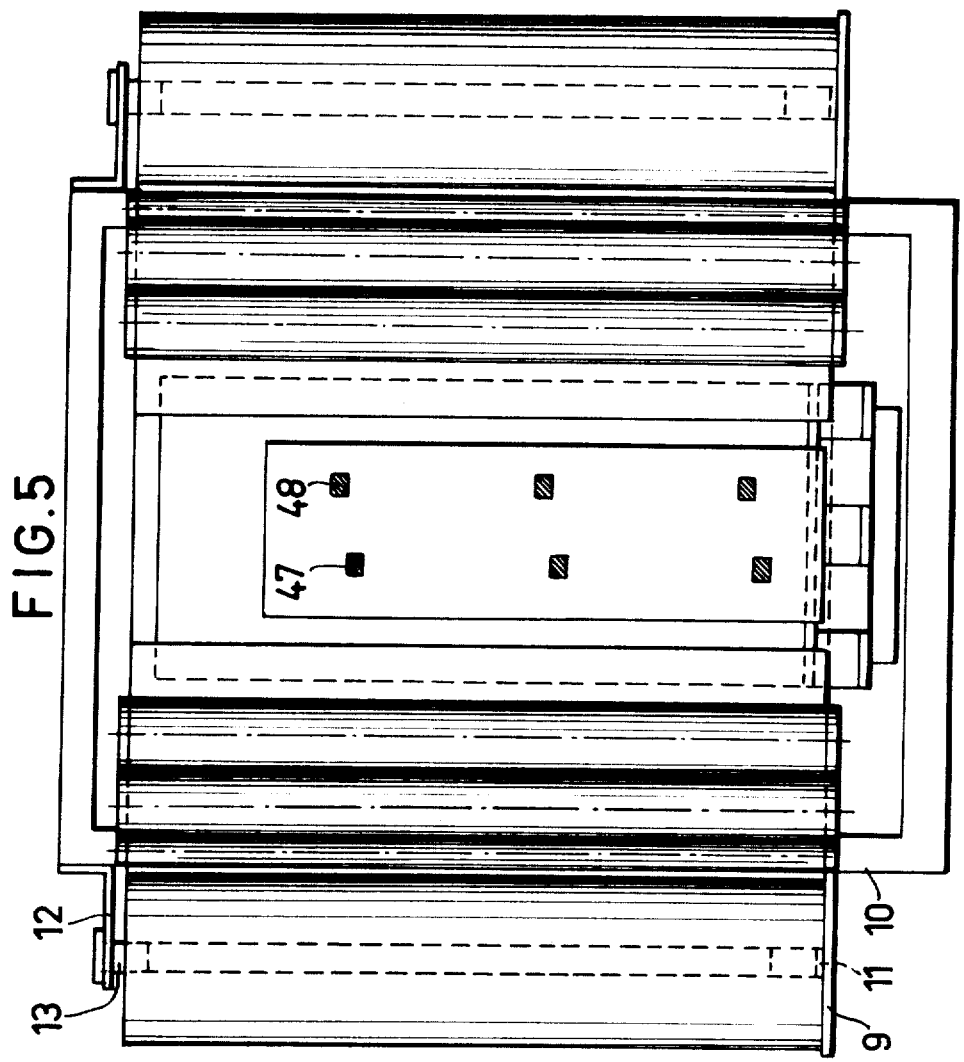
Figure 6:
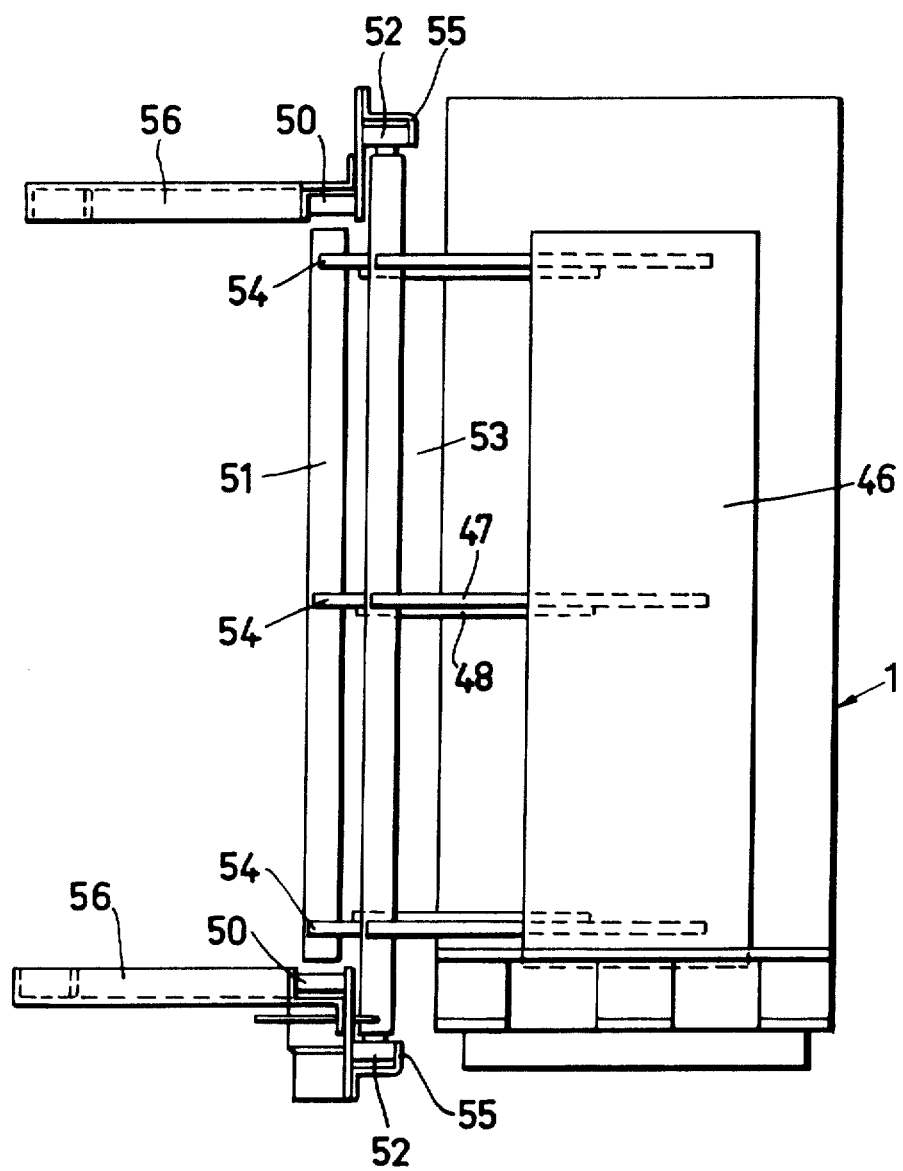
Figure 7:
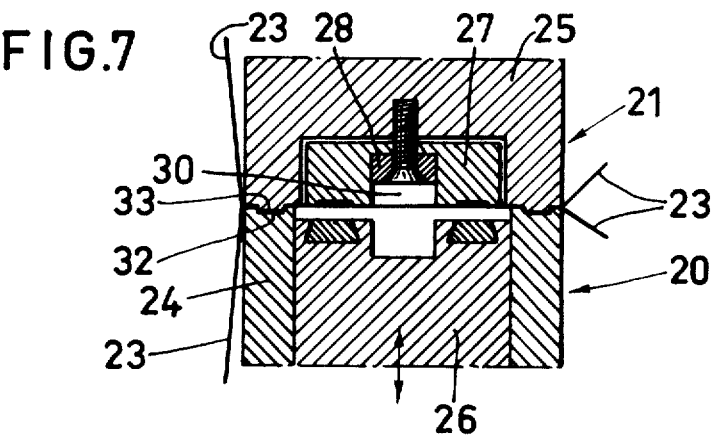
Figure 8:
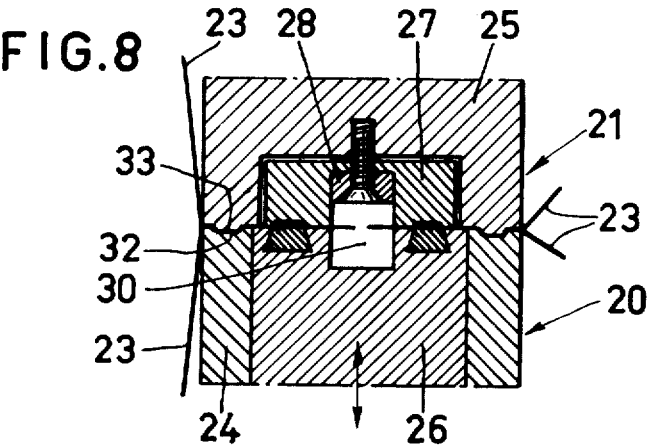
Figure 11:
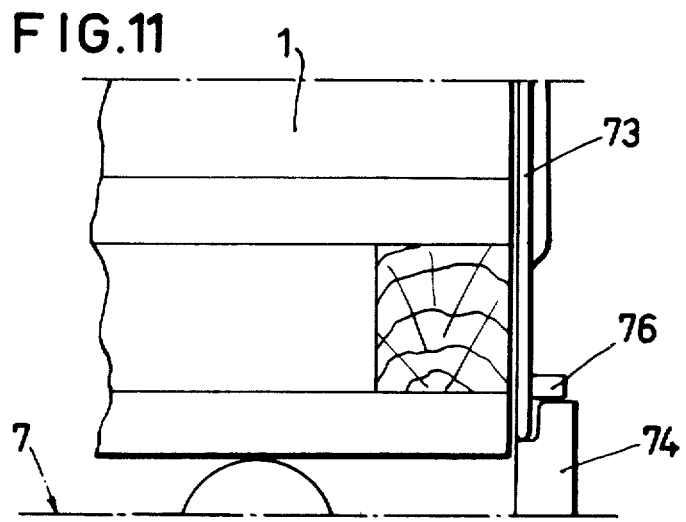
Figure 9:
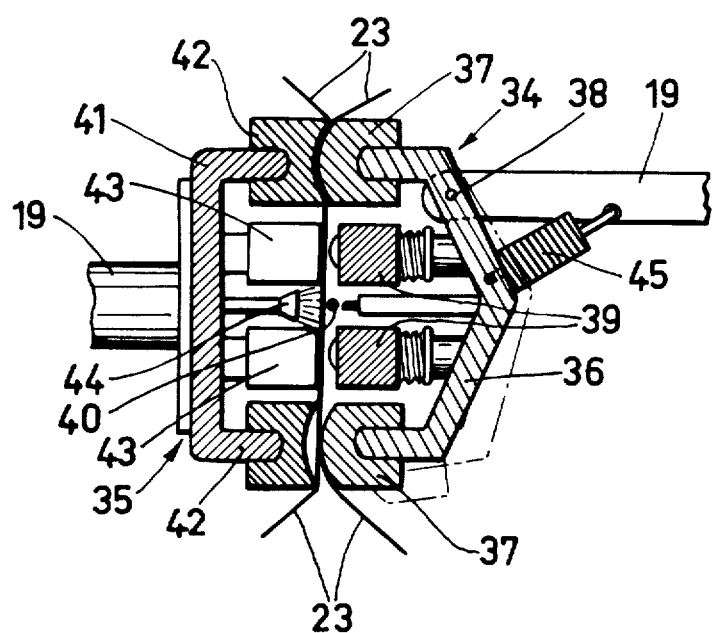

The invention is described in greater detail in the following, with reference to the accompanying drawings wherein FIGS. 1, 2 and 3 in a schematic way illustrate different ways of carrying out the method according to the invention, FIG. 4 shows a plane view of an embodiment of the arrangement for carrying out the method according to FIG. 1, FIG. 5 shows in a schematic way an end view of the arrangement seen in the feed direction of the transport bodies, FIG. 6 shows a side view of a feed unit for the transport bodies comprised in the arrangement, those parts not associated with said unit being removed for the sake of clearness, FIGS. 7 and 8 show sections through the clamping and sealing means in different positions, i.e. immediately prior and subsequently, respectively, to the sealing proper and the cutting, FIG. 9 shows in a schematic way an alternative embodiment of the clamping and sealing means, FIG. 10 shows in a schematic way an alternative feed unit, and FIGS. 11 and 12 show certain details of said unit.

In the drawings 1 designates a transport body comprising a loading pallet 2 or other suitable support, for example in the form of a plate with or without rollers, and placed thereon stacked goods 3, which transport body is to be packaged by applying the method according to the invention in an arrangement adapted therefor. The method according to the invention substantially comprises the steps that a coherent foil or film of a plastic material with such elastic properties, that the film can be stretched up to about 50 percent without loosing its elasticity, is caused to enclose the transport body whilst simultaneously the film is stretched to such an extent, that after it has been applied about the transport body and after it was sealed by welding at two separate places along the entire length of the film and cut off, the film has been given a permanent state of stress aiming to hold together the goods 3 stacked on the pallet 2 and safely to retain the goods on said pallet even when the transport body is subjected to relatively strong external lateral forces. The aforementioned wrapping, sealing and cutting is described below in detail.

Figure 2:
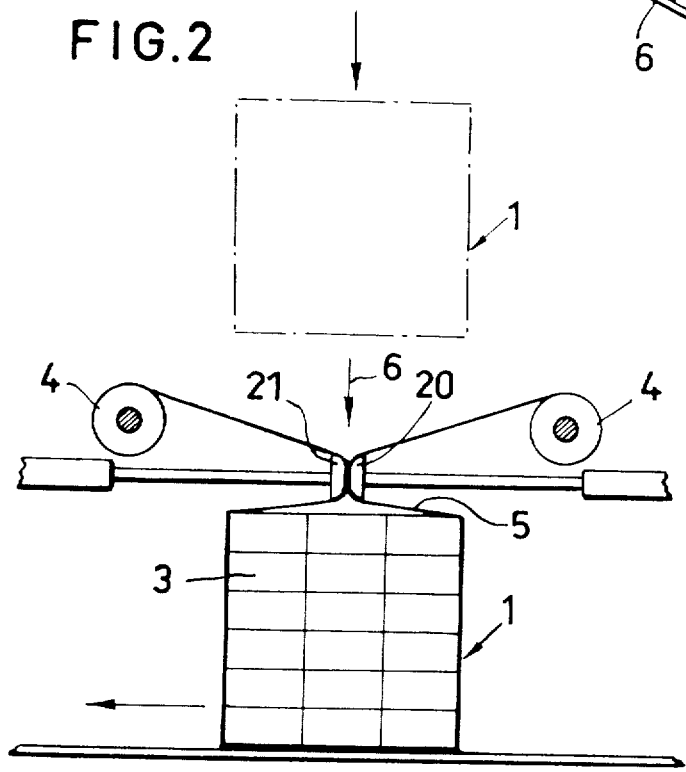

The wrapping proper of the transport body can be effected in such a way, that the transport body 1 is moved, either from the side, as shown schematically in FIG. 1, or from above, as shown schematically in FIG. 2, against a film 5 being stretched across the track of motion 6 of the transport body and fed from two supply rolls 4, located one on each side of the track of motion of the transport body. Said film is fed from the supply rolls by the transport body 1 during its motion along the track past the supply rolls to a predetermined position, or in another suitable way, and simultaneously so stretched that the film 5 caused to enclose the transport body is given the desired state of stress. It is also possible to effect the wrapping of the transport body by inserting it from the side into a loop formed by a suspending film fed from two supply rolls of horizontal arrangement, as schematically shown in FIG. 3.

Further details concerning the method according to the invention will become evident from the following description of embodiments of the arrangement for carrying out the method shown in FIGS. 3–12.

At the embodiment shown in FIG. 4 a conveying or feed-in track 7 is provided, for example in the form of a roller conveyor, to which the transport bodies 1 can be advanced directly from a connecting track (not shown) or from trucks, and which preferably should have such a length that it can take a supply of a suitable number of transport bodies. Two transport body positions are marked by dash-dotted lines and designated by A and B, respectively, in FIG. 4. In addition to these positions a position C, starting position, is marked by dash-dotted lines, and a position D, sealing position, is marked by fully drawn lines, showing that a transport body 1 is in this position.

At this embodiment, furthermore, the film supplies are arranged vertically and in the form of rolls 8, one roll on each side of the feed-in track 7, which rolls are in connection with each other by the film 5, which in its starting position indicated by dash-dotted lines in FIG. 4 extends across the feed-in track 7 of the transport bodies 1. The transport bodies to be packaged are moved from the side towards and into contact with the film, which thus by the transport body and/or in another way is fed from the supply rolls. Each of said supply rolls 8 is placed on a plate 9 (FIG. 5) mounted at a stand 10 for taking up the downwardly directed pressure of the roll, and provided with a pivot 11 for guiding the supply roll. At the upper end of the stand is provided a console 12 so movable as to be adapted for adjustment to different widths of the film, which console also is provided with a pivot 13 for guiding the supply roll. The friction between the supply roll and plate 9 usually is sufficient for acting as a brake preventing the supply roll to be wound at too high a speed. The plates, of course, may be mounted rotatably, but in such a case also a special brake means must be provided which acts on the plate and/or supply roll.

The feeding, respectively the braking and refeeding, of the film 5 extending between the supply rolls and along a film path is effected by means of two rolls 14 disposed on each side of the feed-in track 7, between which rolls the film runs. Said rolls preferably are driven synchronously each by its motor (not shown) of such a type that it easily can be programmed for different speeds and definite directions of motion, and which also can act as a brake. It is also possible to provide a single motor of this kind for driving all rolls 14, which thereby are caused to operate synchronously by help of a chain or gear transmission coupled to said motor. The choice between one or several drive motors for the rolls 14 depends to some extent on the forces which may be used for stretching the film. Between each roll pair 14 and adjacent supply roll, furthermore, a balancing roll 15 is disposed about which the film is drawn and which is adapted always to hold the film stretched.

On the stand 10 a pair of locking claws 16 are pivoted and adapted automatically to swing inwardly immediately after a transport body has been brought into position D, in which position the wrapping of the transport bodies is completed, in order to retain the transport body in this position against the action of a backwardly directed force exerted on the transport body by the stretched film when the feed unit 17 for the transport bodies is pulled back for fetching a new transport body. The locking claws 16 which, therefore, must have a certain vertical extension for being able together with the film safely to retain all parts of the transport body, are pivotally mounted at vertical shafts 18, which in addition pivotally support at least two arms 19 provided at a suitable spaced relationship on each side of the feed-in track 7. Each such pair of arms support at their ends clamping and sealing members 20 and 21, only shown schematically in FIG. 4, which have a length in vertical direction at least equal to the width of the film, and each arm pair is adapted to be swung inwardly simultaneously and synchronously with the other pair of arms by help of an electric, hydraulic or pneumatic drive means 22 provided for each arm pair — preferably a hydraulic drive means, suitably in the form of a hydraulic cylinder, for effecting said inward pivotal motion, because hereby the arms 22 can be given a certain definite speed — in order to move together the film strands 23 extending from the transport body at the ends of the locking claws after the unit 17 has been withdrawn. At the same time as the arms 19 are swung inwardly, film is fed from the supply rolls, but only to such an extent that the film, after the sealing of the film strands 23 thus moved together, is given such a state of stress that the components of the transport body safely are fixed relative to each other and form one unit. The stretching of the film during the wrapping of the transport body also brings about the effect that the film edge portion 5a, or edge portions, see FIG. 10, located above the transport body are somewhat folded inwardly, whereby it will be possible in a subsequent step easily to attach an adhesive film for covering the upper surface of the transport body or its end walls at such arrangements where the supply rolls are arranged horizontally and the transport bodies are fed in from above (FIG. 2) or from the side (FIG. 3).

Said clamping and sealing members 20 and 21 comprise two U-shaped clamping jaws 24 and 25 (FIGS. 7 and 8) and within said jaws U-shaped sealing or welding jaws 26 and 27, respectively, which when moved together effect two welding seams suitably spaced from each other. The welding jaw 27 is stationary, for example retained by means of a clamping strip 28, in the recess of the clamping jaw 25. The other welding jaw 26 is movable in the recess of the clamping jaw 24 so as, subsequent to the clamping of the film strands 23 between the clamping jaws 24 and 25, to be moved against the other welding jaw in order to weld together the film strands at two separate places along the entire width of the film. The movable welding jaw is moved against the stationary welding jaw preferably by means of a hydraulic cylinder 29, see FIG. 4. Within the stationary welding jaw, furthermore, is provided an electrically heated cutting wire 30, which by means of one or several hydraulic cylinders 31, see FIG. 4, can be moved against the film strands 23 thus joined and welded together, in order to cut off said strands between the welding seams. Subsequent to the cutting of the film strands, the film is cooled between the clamping jaws by air jets directed from above, from below and from the side. Hereby it is to be observed that the potential over the welding jaws must be interrupted a certain time prior to the separation of the jaws, in order to obtain the necessary cooling.

The clamping jaws, as shown in FIGS. 7 and 8, are provided at their surfaces facing each other with longitudinal grooves 32 and, respectively, for engaging said grooves with projections 33 in order to improve the locking of the film strands 23 between the clamping jaws 24 and 25. Hereby is effected simultaneously a higher precision of the clamping jaw movement in its final phase.

FIG. 9 shows an alternative embodiment of the clamping and sealing members, comprising a clamping jaw 34 pivotally mounted at one arm pair 19 and a clamping jaw 35 rigidly mounted at the other arm pair 19 and acting as a dolly. The pivotal clamping jaw 34, which includes a yoke-shaped structure 36 and at the free ends thereof strips 37, preferably of rubber, with convex surfaces, is mounted eccentrically and pivotally on a shaft 38 extending between the arms 19 on one side of the feed-in track 7 and is normally held by a strong spring 45 in the position indicated by dashed lines in FIG. 9. On the structure 38 of the movable clamping jaw are further mounted a pair of welding jaws 39, which for example hydraulically can be moved in the direction to the stationary clamping jaw, and an electrically heated cutting wire 40, which for example hydraulically can be moved in the same direction as the welding jaws 39 for cutting off the film strands 23 welded together between the clamping jaws.

Said stationary clamping jaw also comprises a yoke-shaped structure 41, which is secured at the arms 19 on the other side of the feed-in track 7 and at its free ends supports strips 42, preferably of rubber, with concave surfaces, for coaction with the convex surfaces of the strips on the movable clamping jaw, in order safely to clamp the film strands 23. Within said stationary clamping jaw further are mounted a pair of stationary welding jaws 43 for coaction with the movable welding jaws 39, and a longitudinal nozzle 44 for ejecting air for cooling purposes.

When, thus, the two arm pairs 19 are moved against one another so as to effect clamping, sealing and cutting of the film strands 23, the upper strip 37 in FIG. 9 will first be brought into contact with the film strands and move them against the strip 42 acting as a dolly. Thereby the film strands 23 closest to the transport body 1 are so clamped that the state of stress achieved in the film all around the transport body safely is maintained. Before the lower strip 37 in FIG. 9 will come into contact with the film strands and clamp them against the other strip 42 acting as a dolly, which clamping takes place during the continued motion of the arms 19, film is fed from the supply rolls 8 to such an extent, that the stress in the film after the strips 37, 42, which already have been moved together, is approx. equal to zero. First thereafter the other strips 37, 42 are moved together against the action of spring 45 for clamping the film in a stress-free state between the clamping and sealing members. Owing to the eccentric mounting of the pivotal clamping jaw 34, there is never a risk that the clamping effect between the strips, which were moved together first, will get lost during the swinging motion of the clamping jaw 34 to a position in which the film strands 23 safely are retained between all of the strips of the clamping jaws. Subsequent to the clamping of the film strands, the pair of movable welding jaws is caused to move against the stationary ones in order to connect the film strands with each other at two separate places, between which places the film then is cut by the movable annealed wire 40. Thereafter air for cooling is blown in through the nozzle 44. Said clamping and sealing members, thus, ensure that the film is welded together and cut in a stress-free state.

As already mentioned, at one side of the feed-in track 7 a feeding unit 17 is provided, for being able to feed the transport body 1, which is in turn to be moved into contact with the film 5 stretched across the feed-in track 7, from the position C to the position D with about the same speed, independent of the resistance applied by the film on the transport body. Said unit comprises a pressure plate 46 supported by several arms 47, 48 which in a suitable way are connected with a carriage 49 movable along the track 7. Said carriage comprises a front wheel pair, the wheels 50 of which are connected with each other by an axle 51, and a rear wheel pair, the wheels 52 are connected with each other by an axle 53. Said axle 53 is connected with said axle 51 by stays 54, with which the arms 48 are connected. The arms 47, however, are connected with the axle 51 of the front wheel pair.

The rear wheel pair are arranged to run in straight guide beams 55, and the front wheel pair in guide beams 56, the rear portion of which is swung outwardly, so that the pressure plate 46 in its rearward position indicated in FIG. 4 by dash-dotted lines is offset sideways from the feed-in track 7 of the transport bodies so as to render possible the advancing of a new transport body 1 from position B to position C. Said advancing preferably can be effected by mounting the feed track 7 slopingly from the supply of transport bodies to the position C, in such a way, that a pair of preferably automatically releasable locking members, as shown schematically at 57 in FIG. 4, are adapted to retain the transport bodies in the supply until a new transport body is to be advanced, to stop the transport body coming from the supply in the position C and to retain it in this position until the pressure plate 46 is brought into contact with the transport body for pushing it to the sealing position. In order to prevent the transport body being next in turn in the supply from directly following with the preceding body, in that portion of the track 7 which carries the supply of transport bodies a brake means is provided, which is shown schematically at 58 in FIG. 4.

The motion of the carriage 49 and thereby of the pressure plate 46 between the end positions is effected by means of chains 59, which at their ends are connected, for example, with the axle 53 and from said axle are drawn over chain wheels 60 acting as deflecting wheels and via drive wheels 62 mounted on a common drive axle 61 back to the axle 53. The drive axle 61 common to the two drive wheels 62 is connected in a suitable way with a reversible drive motor (not shown).

Under the condition that the carriage 49 is in the position indicated in FIG. 4 by dash-dotted lines, the arrangement according to the invention for packaging transport bodies is started automatically when a transport body arrives at position C and is stopped by the locking member 57. Said starting, with other words, implies that the drive motor for the feeding unit 17 is started. During the motion of the carriage 49 along the guide beams 55, 56 the pressure plate 46 is inserted behind the transport body in position C and brought into engagement with said body for pushing it along the track 7 against the film 5, which by the roll pairs 14 is held in the desired state of stress. When the transport body 1 with its front edge comes into contact with the stressed film, the feed of the film is started, which takes place by means of the roll pairs 14 at a speed so adjusted to the advancing speed of the transport bodies that the film is held stretched or is stretched to the extent required for achieving the desired state of stress. It is to be observed in this connection that the feeding of the film may take place solely by help of the transport body, in which case, however, the roll pairs 14 must act as brake means so as to achieve the desired state of stress in the film.

The transport body having assumed the sealing position D, a photoelectric cell device (not shown) is actuated so that the advancing of the transport body is stopped and the locking claws 16 at the simultaneous feed of the necessary film amount are swung inwardly so as to prevent the transport body from moving backwards and thereby to reduce the stress in the film about the transport body.

Subsequent to the engagement of the locking claws 16 about the transport body, the drive motor for the feeding unit 17 is connected for pulling back the pressure plate 46 and carriage 49 to the rear end position, and further are connected the control means 22 for swinging inwardly the arms 19, which by help of the clamping and sealing members 20, 21 clamp, weld together and cut the film strands 23, whereafter the weld seams and the place of cutting are subjected to cooling.

Whilst one transport body is being completed, automatically a new transport body is advanced from position B to position C. This new transport body is advanced by the feeding unit 17 as shown as the wrapped transport body leaves the position D. The entire cycle performed by the arrangement according to the invention, can be controlled automatically by means and devices not described here.

FIG. 11 shows an alternative unit 17 for advancing transport bodies from position C to position D. This unit comprises a stand 63 with two horizontal guide rails 64 in parallel with the track 7 for a driven carriage 65 travelling in both directions and carrying two vertical racks 66 whereof only one is shown in FIG. 11. With each rack 66 coacts a gear wheel 67. Said two gear wheels, for example, are mounted on a rod 68 extending between and guided by a pair of guide members 69 supported on the carriage. At said rod 68 further are mounted one or several chains 70, each extending over its deflection wheel 71 provided between the upper ends of the racks, and connected to a motor 72 supported on the carriage. By means of this arrangement, thus, the rod 68 and connected therewith a plate 73 can be lifted and lowered. Said plate 73, which has the same function as the pressure plate 46 in FIG. 4, can, thus, be moved down behind a transport body and is thereby adapted to be guided in between the transport body and two (one on each side) shoulders 74 (see FIG. 11) advancing said body. Said shoulders are arranged each on its band provided with a plurality of such shoulders, so as by help of the carriage 65 and said bands to move the transport body to the sealing position, in which the carriage and the bands are stopped. For starting the carriage 65, one or several switches 75 connected to the drive motor of the carriage are provided on the plate 73, which switches are connected by the shoulder 74 in question. Thereafter the arms 19 are swung in and move together the film strands 23 to be sealed. In this connection it is to be observed that the distance between the clamping and sealing members 20, 21 and the plate 73 shall be such, that the plate can be pulled up without damaging the film, as is shown schematically in FIG. 12. Subsequent to the sealing of the cuts of the film strands the motor 72 is actuated for automatically pulling the plate 73, in such a manner, that a stop member 75 movably supported on the racks 66 is adapted to press against the upper surface of the transport body so as to prevent any goods to follow with the plate 70 when it is being pulled upwards. Said stop member preferably is actuated hydraulically. The plate 70 having been pulled upwards, the bands with the shoulders 74 are started for removing the transport body from the sealing position and carriage 65, which carriage thus returns to the starting position where the plate 73 again is moved down behind a transport body.

This invention is not restricted to the embodiments described above and shown in the drawings by way of example, but can be changed and modified in many different ways within the scope of the claims. It is possible, for example, to exclude for a certain type of film the rolls 14 and the balancing rolls 15 with their associated mechanisms. In such a case the supply rolls are driven and braked directly.

What is claimed is:

1. A method for wrapping a film, having an elasticity such that it will stretch substantially without losing said elasticity about four sides of an object or stack of objects comprising:
   moving said object into said film while simultaneously stretching said film about three sides of said object;
   bringing the portions of said film adjacent the fourth side of said object together while said film is still under tension and clamping said portions together along a first line transverse to the length of said film;
   releasing the tension on said film;
   clamping said portions of film along a second line parallel to said first line whereby the area between the two lines will be free of tension;
   welding said portions of said film between said two lines; and
   cutting said film within the weld.

2. A method in accordance with claim 1 wherein the film is disposed in a vertical plane and the object is moved horizontally into said film.

3. A method in accordance with claim 1 wherein the film is disposed in a horizontal plane and the object is moved vertically into the film.

4. A method in accordance with claim 1 wherein the film is disposed in a horizontal plane, a loop of said film is formed and the object is moved into said loop horizontally.

5. Apparatus for wrapping a film, having an elasticity such that it will stretch substantially without losing said elasticity about four sides of an object or stack of objects, comprising:
   a pair of film supply rolls spaced one from the other and having a continuous length of said film therebetween;
   means for moving said object into said continuous length of film;
   means for maintaining tension on said film simultaneously with the movement of said object to stretch said film about three sides of said object;
   means for bringing the portions of said film adjacent the fourth side of said object together and clamping said portions together along a first line transverse to the length of said film while said film is still under tension;
   means for relieving the tension on said film;
   means for clamping said portions of said film along a second line parallel to said first line after the tension on said film has been released;
   means for welding said film between the two lines of welding;
   and means for cutting said film within the weld.

6. Apparatus in accordance with claim 5 wherein the means for moving the object into the film is an arm slidably mounted on a track which curves outwardly at its end furtherest from the film to swing said arm out of the path of the object until the object is in position to be moved by said arm.

7. An apparatus in accordance with claim 6 wherein the arm is adapted to be withdrawn from contact with the object prior to the actuation of the means for bringing the two portions of the film together and the apparatus additionally includes a pair of pivotally mounted locking jaws for clamping the film about the corners of said object adjacent the fourth side of said object prior to withdrawal of said arm and prior to the actuation of said means for bringing the portions of said film together.

8. Apparatus in accordance with claim 5 wherein the means for maintaining tension on the film is a braking means operatively associated with the supply rolls.

9. Apparatus in accordance with claim 5 wherein the means for moving the object into the film is mounted on a track parallel to the path of said object and carries a pusher plate slidable into and out of the path of said object and adapted to hold the object against the film under tension until after the means for clamping the first line is actuated.

10. Apparatus in accordance with claim 5 wherein the means for bringing the portions of the film together and the means for clamping said film along the two lines is a unitary means comprising a pair of generally-U-shaped, opposed jaws, a pair of welding strips and a cutting means mounted between the jaws and means for pivotally mounting said jaws and pivoting said jaws inwardly against each other, first between the two portions of the U closest to the object and then between the portions of the U furthest from the object after the tension on said portions of said film has been released.

11. Apparatus in accordance with claim 10 wherein the clamping jaws are of a width corresponding to the width of the film.

12. Apparatus in accordance with claim 10 wherein one of the clamping jaws is mounted on a second pivot means and is adapted to first contact the opposing clamping jaw at the portion of the U closest to the object and then pivot so as to bring the other portions of the Us together.

13. Apparatus in accordance with claim 12 wherein the pivoted clamping jaw is normally held in its outwardly pivoted position by means of a spring.

* * * * *